United States Patent [19]

Cohen

[11] Patent Number: 4,510,581
[45] Date of Patent: Apr. 9, 1985

[54] HIGH SPEED BUFFER ALLOCATION APPARATUS

[75] Inventor: Paul B. Cohen, Ashland, Mass.

[73] Assignee: Prime Computer, Inc., Natick, Mass.

[21] Appl. No.: 466,079

[22] Filed: Feb. 14, 1983

[51] Int. Cl.³ .................................. G06F 1/00
[52] U.S. Cl. ................................... 364/900
[58] Field of Search ................. 364/900 MS File

[56] References Cited

U.S. PATENT DOCUMENTS

| 3,032,746 | 5/1962 | Kautz | 340/172.5 |
|---|---|---|---|
| 3,344,406 | 9/1967 | Vinal | 340/172.5 |
| 3,348,209 | 10/1967 | Brooks | 340/172.5 |
| 3,439,342 | 4/1969 | Barton | 340/172.5 |
| 3,601,546 | 9/1971 | Lee | 179/18 EB |
| 3,621,152 | 11/1971 | Billings | 360/72.1 |
| 3,742,466 | 6/1973 | Hamm et al. | 340/173 RC |
| 3,812,371 | 5/1974 | Chin | 250/557 |
| 3,818,461 | 6/1974 | Ward et al. | 340/172.5 |
| 3,859,641 | 1/1975 | Clemons et al. | 307/475 |
| 3,925,689 | 12/1975 | Rubenstein | 307/475 |
| 4,054,747 | 10/1977 | Pachynski, Jr. | 375/118 |
| 4,079,456 | 3/1978 | Lunsford et al. | 364/200 |
| 4,092,713 | 5/1978 | Scheuneman | 364/200 |
| 4,121,261 | 3/1978 | Blossey | 358/301 |
| 4,131,940 | 1/1979 | Moyer | 364/200 |
| 4,136,399 | 1/1979 | Chan et al. | 364/900 |
| 4,144,562 | 3/1979 | Cooper | 364/200 |
| 4,145,751 | 3/1979 | Carlow et al. | 364/900 |
| 4,153,944 | 5/1979 | Grandle | 364/900 |
| 4,158,235 | 6/1979 | Call et al. | 364/900 |
| 4,161,778 | 7/1979 | Getson, Jr. et al. | 364/200 |
| 4,162,520 | 7/1979 | Cook et al. | 364/200 |
| 4,169,289 | 9/1979 | Shively | 364/900 |
| 4,185,190 | 1/1980 | Bottard et al. | 235/304 |
| 4,195,343 | 3/1980 | Joyce | 364/200 |
| 4,202,042 | 5/1980 | Connors et al. | 364/900 |
| 4,225,922 | 9/1980 | Porter | 364/200 |
| 4,229,804 | 9/1980 | Imazeki | 364/900 |
| 4,229,815 | 9/1980 | Cummiskey | 370/84 |
| 4,236,225 | 11/1980 | Jansen et al. | 364/900 |
| 4,254,464 | 3/1981 | Byrne | 364/200 |
| 4,258,418 | 3/1981 | Heath | 364/200 |
| 4,261,035 | 4/1981 | Raymond | 364/200 |
| 4,276,609 | 6/1981 | Patel | 364/900 |
| 4,281,393 | 7/1981 | Gitelman et al. | 364/900 |
| 4,281,398 | 7/1981 | McKenny et al. | 265/200 |
| 4,291,370 | 9/1981 | Charles | 364/200 |
| 4,297,595 | 10/1981 | Huellwegen | 307/268 |
| 4,307,461 | 6/1974 | Brickman et al. | 370/58 |
| 4,315,312 | 2/1982 | Schmidt | 364/200 |
| 4,328,580 | 5/1982 | Stockham, Jr. et al. | 371/8 |
| 4,330,720 | 5/1982 | Moore | 307/270 |

Primary Examiner—Raulfe B. Zache
Attorney, Agent, or Firm—Lahive & Cockfield

[57] ABSTRACT

A high speed data buffer array allocation circuit is provided in association with a plurality of buffer memories for directing high speed data into the memories. The circuitry employs high speed MOS technology to implement high speed switching and data allocation. The data packet input, generally from an uninterruptible source, is directed and written into a first available buffer memory. The memory can thereafter be read by a host computer. Flags are set indicating the availability of the memory for reading. The data buffer allocation circuit has a plurality of selection circuits connected in an ordered linear array for effectively passing therethrough to the circuit associated with the first available buffer, a data ready input signal. In response to the data ready input signal, the selection circuit and associated gating circuit provide the necessary control to direct the data to the associated memory and to thereafter leave a flag indicating the availability of data. The selection circuit further latches a pass-through element of the circuit to a conductive state whereby the next data ready input signal is passed to a succeeding buffer along said array. When data is read by, for example, the host computer, the buffer selection circuit returns to an operating state wherein the data ready signal is isolated from succeeding selection circuits and the data available flag is removed.

8 Claims, 6 Drawing Figures

HIGH SPEED BUFFER ALLOCATION APPARATUS

BACKGROUND OF THE INVENTION

The invention relates generally to the storage of data in a high speed computer environment, and in particular to a buffer allocation circuit for directing input data packets to avaiable buffer memories for later access by a host computer.

In a data communications environment, if often occurs that incoming data packets must be directed in real time and under severe time constraints into one of a plurality of available buffers. In those environments where the data flow cannot be interrupted, for example a high speed computer network, rapid assessment of which buffers are already written with data, and hence are unavailable, must be made. The data must be directed therefore to those buffers which are empty, or which had been written and subsequently emptied or processed, to avoid data loss.

When the data is incoming at extremely high data rates, and is not interuptable, the circuitry to direct the data has been expensive and complex. Further, as the number of buffer memories increases, the directing circuitry generally increased according to the square of the number of buffers employed. As a result, systems with large numbers of buffer memories require very complex direction circuitry; and this very same complex direction circuitry thus tends to inhibit the use of additional memories which would otherwise expand the memory capabilities of the apparatus.

It is therefore an object of this invention to reliably direct incoming, uncontrolled and uninterruptable data, to available buffer memories without loss of data and with minimum circuit complexity. Further objects of the invention are circuitry that can be linearly expanded to service additional buffer memories in a simple and reliable manner, and circuitry that can be expanded at minimum cost consistent with reliable and error free data reception.

SUMMARY OF THE INVENTION

The invention relates to a data buffer array allocation circuit for directing incoming data to an available one of a plurality of buffer memories. The allocation circuit features a plurality of buffer selection circuits each being associated with one of the buffer memories and each selection circuit having a clear input line, a data ready input line, a data ready output line, and a buffer available line. The allocation circuit further features circuitry for connecting the selection circuits in an ordered linear array, the data ready output line of an earlier buffer selection circuit being connected to the data ready input line of a next succeeding buffer selection circuit of the linear array.

Each buffer selection circuit features a latch circuit responsive to the data ready input line and the buffer available line for operating in a first state wherein the data ready input line and data ready output line are effectively connected to each other. This first state occurs when the associated buffer has data therein ready for reading. The circuit is further operable in a second state for effectively isolating the data ready input line from the data ready output line when the associated buffer is available for receiving data. Further circuitry is also provided, responsive to an activating clear pulse supplied over the clear input line, for setting the buffer available line to a signal which indicates the absence of data in the associated buffer. Additional circuitry is responsive to a data ready signal on the data ready input line, if the buffer is not being used, for setting the buffer available line to a signal indicating the availability of data in said associated buffer.

In other aspects, the data buffer allocation circuit further features circuitry responsive to one or more signals from the associated data selection circuitry for directing incoming data packets into the one of the plurality of buffer memories which is associated with the first buffer selection circuit of the ordered array wherein the data ready input and data ready output lines are effectively isolated from each other. The direction circuitry can be responsive to the buffer available lines for appropriately directing the data packets.

In a preferred embodiment, the isolation circuitry includes a bidirectional metal oxide semiconductor pass transistor controlled by a digital circuit which latches the pass transistor gate to connect the data ready input and ouptut lines when the buffer available line indicates the availability of data in the associated buffer, but only at a time after the data ready input line signal indicates that no data is being written. This effectively is a delayed latch wherein the delay waits for the entire data packet to be loaded into the buffer memory. The pass transistor is latched in a second state which isolates the data ready input and output lines when the buffer available line has a signal thereon indicating the absence of available data in the associated buffer. Importantly, each selection circuit also employs signal generating circuitry which provides a signal on the data ready input line in the absence of further signal levels to maintain the line in a condition indicating that no data is forthcoming. This is particularly advantageous when the data ready input line of one selection circuit is isolated from the data ready input line of the previous selection circuit of the ordered linear array.

BRIEF DESCRIPTION OF THE DRAWINGS

Other objects, features, and advantages of the invention will appear from the following description of a preferred embidment taken together with the drawings in which.

DESCRIPTION OF A PREFERRED EMBODIMENT

Figure 1:
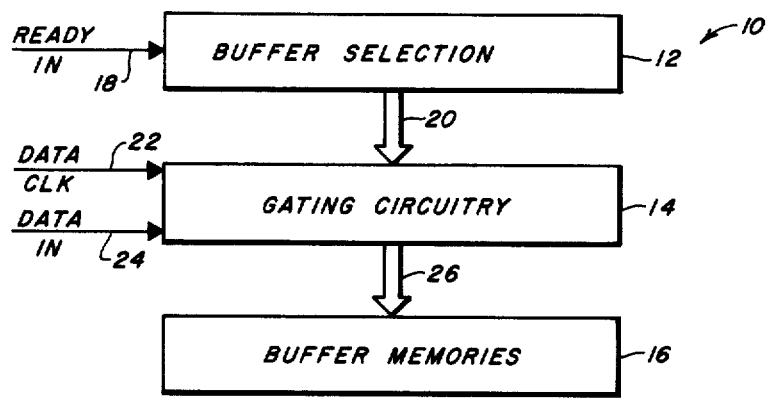
FIG. 1 is a general schematic block diagram showing the allocation circuit.

Referring to FIG. 1, a data buffer array allocation circuit 10 according to the invention has a buffer selection circuitry 12 and a gating circuitry 14, and is associated with a plurality of buffer memories 16. The buffer selection circuitry 12 receives a data ready signal on a data ready input line 18 and directs signals over lines 20 to the gating circuitry. The gating circuitry, in the illustrated embodiment, receives a data clock signal over a line 22 and data input information over a line 24 and directs the data, in accordance with the data clock, to the available buffer memory selected by buffer selection circuitry 12 by signals over lines 26. The buffer memories 16 accept the data and hold it for later read out by for example a host computer.

Figure 2:
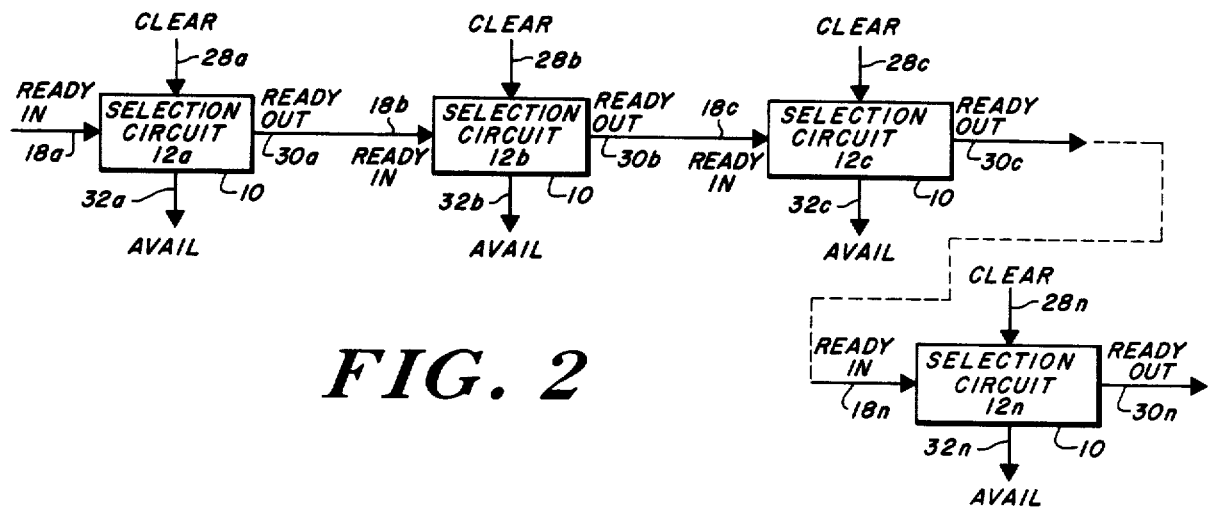
FIG. 2 is a schematic block diagram of a preferred embodiment of the selection circuit array according to the invention.

Referring now to FIG. 2, according to a preferred embodiment of the invention, the buffer selection circuitry 12 has a plurality of buffer selection circuits 12a, 12b, 12c, ..., 12n, which are connected in an ordered linear array. The data ready input line 18 is connected to the first selection circuit, 12a. Each data selection circuit has, in the illustrated embodiment, a data ready input line 18a, 18b, 18c, ..., 18n; a clear line 28a, 28b, 28c, ..., 28n; a data ready output line 30a, 30b, 30c, ..., 30n; and a buffer available line 32a, 32b, 32c, ..., 32n. The data selection circuits are interconnected in the array so that the data ready output line of a selection circuit is connected to the data ready input line of the next succeeding selection circuit. Thus, in the illustrated embodiment, the data ready output line 30a of selection circuit 12a is connected to the data ready input line 18b of selection circuit 12b. As will be seen below, the selection circuit structure allows additional buffer memories to be employed so that the buffer selection circuitry 12 need only increase in size in the same linear progression as do the buffer memories. This simplified structure reduces the complexity found in many prior systems and allows simple, reliable access to as many buffer memories as required.

Figure 3:
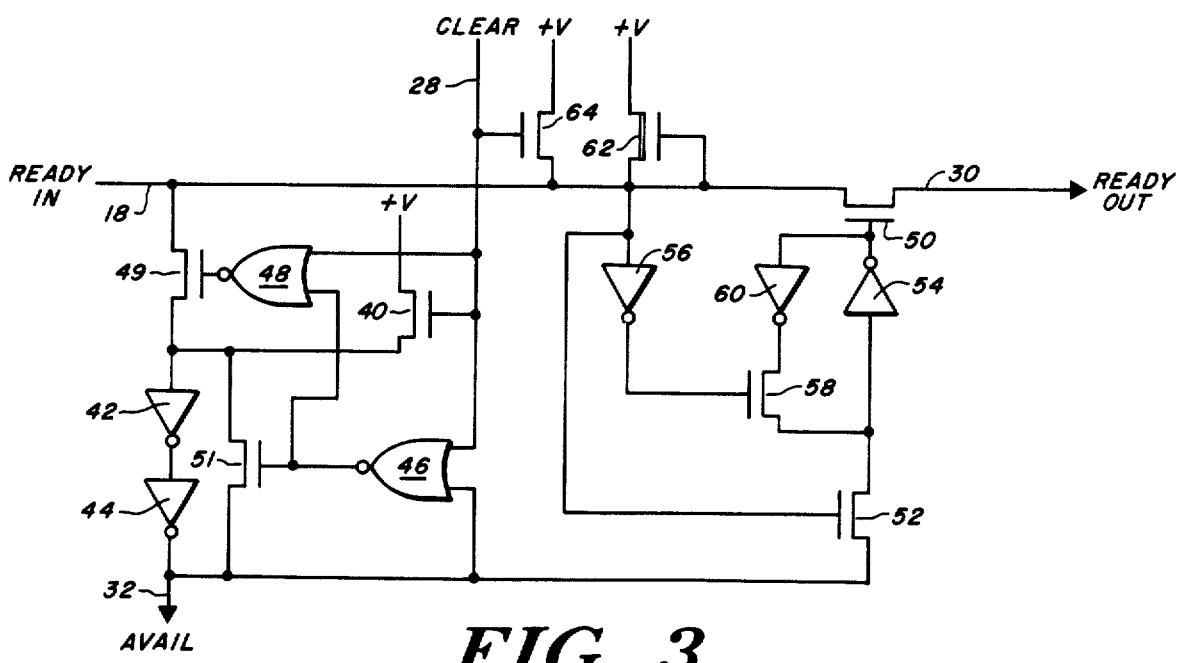
FIG. 3 is a schematic circuit diagram of a preferred embodiment of a single selection circuit according to the invention.

The buffer selection circuits 12 are configured so that the incoming data is gated into the first available buffer along the ordered linear array. In the illustrated embodiment, each buffer selection circuit 12a, 12b, ..., 12n; is a "cell", all cells being identical in structure. Referring to FIG. 3, a typical "cell" according to the invention has, as noted above, a clear input line 28, a data ready input line 18, a data ready output line 30, and a buffer available line 32. In general operation, (and referring to FIG. 4) a clear pulse is provided for example by a host computer, both at the beginning of a turn-on initialization procedure and whenever the buffer memory associated with a particular selection circuit is read. The clear pulse, indicating that the buffer is thus available, causes a signal level on the buffer available line 32 to rise (to a logical "1") at a time when, in the illustrated embodiment, the clear pulse line turns "true" (a logical "1"). After the clear pulse is removed, the "cell" is in a state for directing a next packet of data to its associated buffer. Thereafter, when the data ready input line goes false (a logical "0"), indicating the availability of a packet of data (by a packet of data, in the context herein, is meant a continuous stream of data which may for example be up to 4K bits or more long).

In the illustrated embodiment, the data ready input line goes false at the beginning of the input of data to the associated buffer and immediately thereafter, the buffer available line goes false indicating the buffer is thus available for the host computer. After the buffer has been written, and after the ready input data line returns to a true state, the "announcement" of a next packet of data over the data ready input line will be passed by this particular buffer selection circuit, through the circuit, to the next selection circuit. This is indicated, at 36 of FIG. 4, wherein the data ready output line (for this second packet of data) reflects the signal on the data ready input data line. Thereafter, the buffer is read and a clear line pulse, at 38, again raises the buffer available line and sets this particular buffer selection circuit as being again available to receive the next packet of data.

Referring to FIG. 3, the operation of a typical buffer selection circuit, in accordance with the above functional description for this illustrated embodiment, follows. Upon the assertion to a true signal as a clear input pulse, over line 28, the buffer available output is forced to a positive logic one regardless of its previous state or of the state of the data ready input line 18. This "assertion" is forced as follows. The high signal on line 28 turns on a transistor 40 which causes its positive pull-up voltage to appear at the input of an inverter 42. Inverter 42, in combination with an inverter 44, forces the buffer available line 32 high. The buffer available line will further remain high due to the "feedback" available through a NOR gate 46. The NOR gate 46, having a high input, provides a low output as an input to a NOR gate 48. The low input to NOR gate 48 will, when the clear pulse is removed, turn on transistor 49 causing the normally high input of the data ready input line to be reflected at the buffer available line. Thus, so long as no data is being presented, the buffer available line stays true indicating that the buffer is available for the receipt of a data packet. When a data ready input signal indicates that data is available, the buffer available line goes low, reflecting the signal level change on the data ready input line. The buffer available line then latches low until a clear pulse is received by the circuitry. the NOR gate 46, when the buffer available line and the clear line are both low, turns off transistor 49 through NOR gate 48 and turns on a transistor 51 to latch the buffer available line in a low state. As will be described later, the combination of signals available from the buffer selection circuitry will direct the incoming data to the associated buffer.

As noted above, the buffer selection circuits are interconnected in an ordered linear array and, as noted above, the selection circuits pass therethrough the data ready input line signal to the first selection circuit associated with the first available buffer. In accordance with the invention, a metal oxide semiconductor (MOS) pass transistor 50 and its controlling circuit as described below, are particularly well suited either to effectively isolate the data ready input line and the data ready output line, or to effectively connect the two lines in those instances where the associated buffer is full. Thus, when, prior to loading a buffer, the buffer available line is high indicating the availability of the buffer and the signal level on line 18 is high. A transistor 52 is turned on and thereby provides a high input to an inverter 54 which holds pass transistor 50 off. This effectively isolates the data ready input line from the data ready output line. Correspondingly, an inverter 56 holds a transistor 58 in an off condition.

Thereafter, when the buffer available line goes low in response to a data ready input line signal going low, transistor 58 turns on, and transistor 52 turns off. At this time, however, the signal level input to the pass transistor 50 through inverters 54 and 60 does not change, thereby keeping the data ready input and data ready output lines effectively isolated. Therafter however, when the signal level on the data ready input line goes positive indicating the end of the data packet which has just been directed into the buffer associated with this particular data selection cell, transistor 58 turns off and transistor 52 turns on. The now low buffer available line signal becomes the input to the inverter 54 and causes pass transistor 50 to turn on, effectively connecting the data ready input line 18 to the data ready output line 30 for this particular cell.

Under some operating conditions, there will be some empty buffer memories separated by memories which remain written with data. Correspondingly, some buffer selection circuits will have transistor 50 in a pass-through state and other, perhaps adjacent buffer selection circuits will have transistor 50 in an off state. These selection circuit conditions, depending upon past history of the allocation circuit, can be substantially interwoven along the ordered linear array. The apparatus thus further provides a small pull-up transistor 62 to maintain the data ready input line at a high positive state (in the absence of other controlling signals) indicating that data is not being made available to the selection circuit. In addition, a second pull-up transistor 64 is provided so that a clear pulse will pull up the associated data ready input line.

Figure 5:
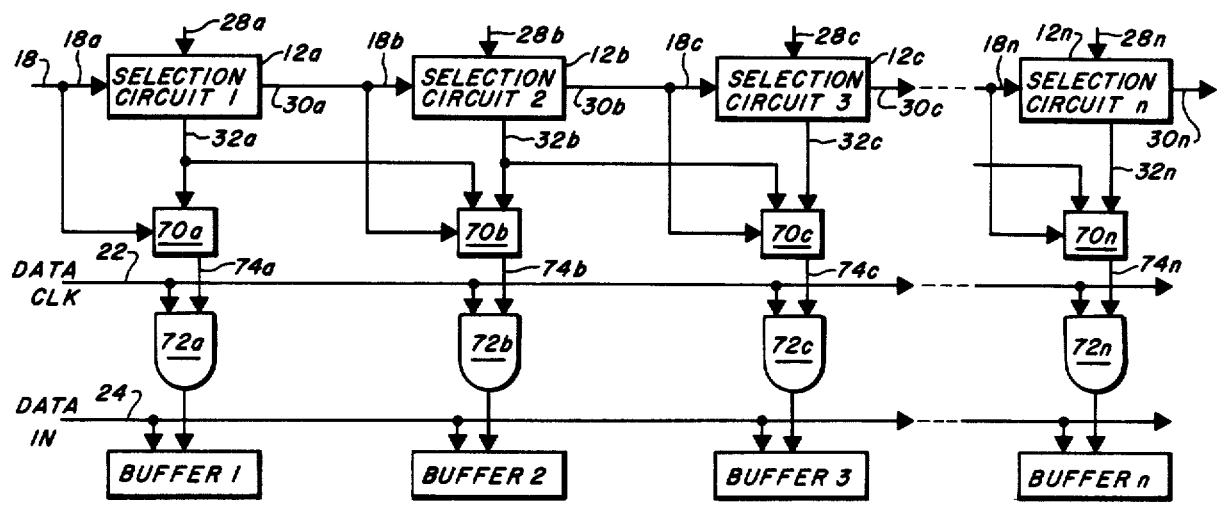
FIG. 5 is a schematic block diagram of a particular embodiment of the allocation circuitry.

Referring now to FIG. 5, in this illustrated embodiment, the gating circuitry associated with each selection circuit has a flip-flop 70 (70a, 70b, . . . , 70n) and an AND gate 72 (72a, 72b, . . . , 72n). Each flip-flop 70 is of the type which can be set upon the occurrence of a transition on an input line associated with a corresponding enabling signal. The transition set input is connected to line 32 of its associated selection circuit and the enabling input is connected to line 32 of the next previous selection circuit. The exception to this is the first flip-flop 70a associated with the first selection circuit 12a of the ordered array. There is no previous selection circuit to circuit 12a. In this instance, the enabling input is permanently connected in the enabled state. Each flip-flop 70 further has a reset input connected to line 18 of its associated selection circuitry.

In operation, the first flip-flop 70a is set when its associated buffer available line transitions negatively from a logical "1" to a logical "0". This occurs, it will be recalled, at the beginning of an incoming data packet wherein the associated buffer memory is to be filled. At that negative transition time, the associated data ready input line is in a nonreset state accordingly a set output level over a line 74 from the flip-flop to the associated gate 72 enables that gate to pass the data clock strobe. The data clock strobe then causes the associated buffer to accept or write the available data input.

At the end of a data packet, the data ready input line goes positive and causes the flip-flop circuitry 70 associated with the just loaded memory to be reset. Thereafter, the next data packet will be loaded into the next available buffer memory. This occurs because it is only the next available buffer which will have associated therewith a flip-flop 70 having both an enabling signal level input (the previous buffer available line is low indicating that the associated buffer is written) and a non-reset input (succeeding selection circuits do not "see" the data ready signal at this time). A negative transition on buffer available line 32b thus sets flip-flop 70b and causes data to be written into the associated buffer.

Figure 4:
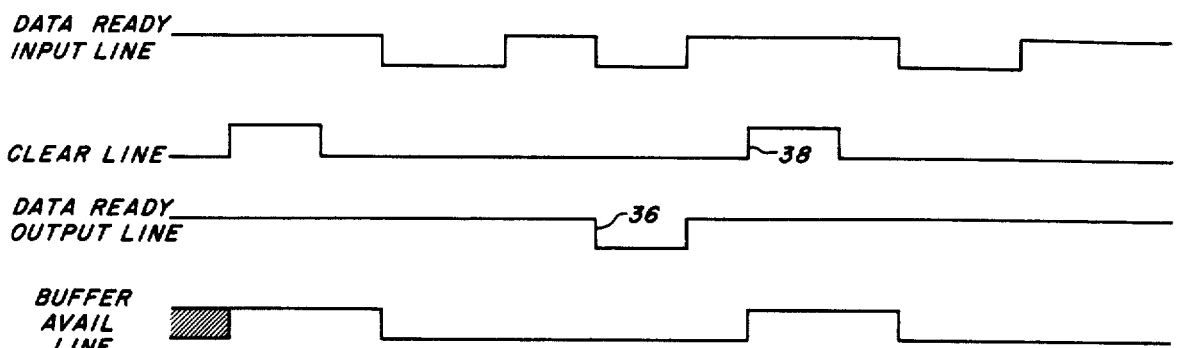
FIG. 4 is a timing diagram showing several signals of the circuitry of FIG. 2.
Figure 6:
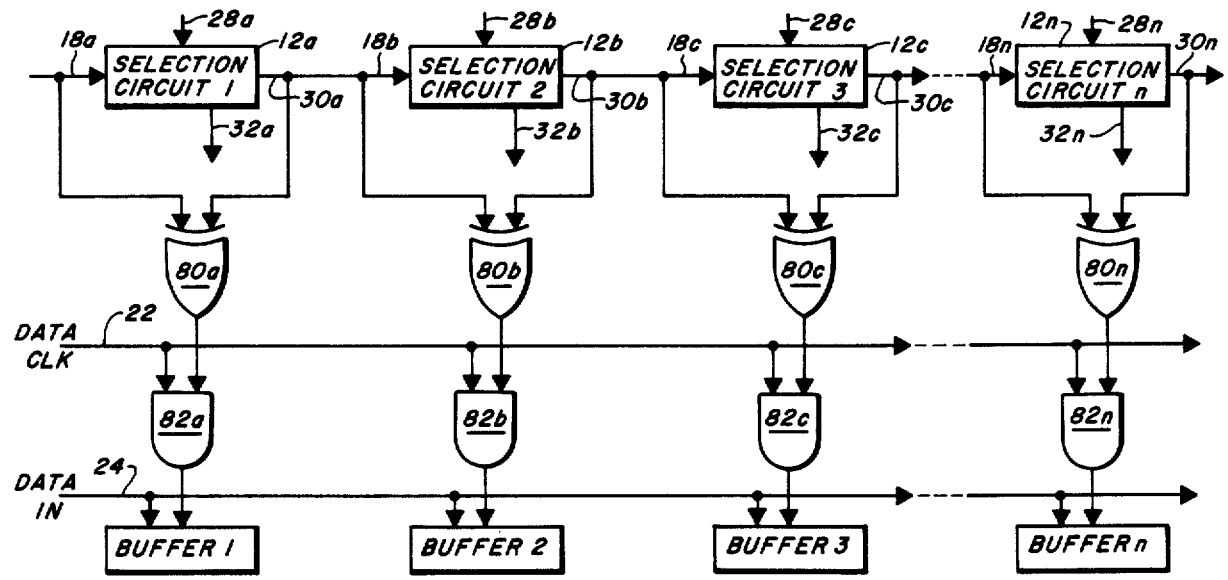
FIG. 6 is a schematic block diagram of an alternate embodiment of the allocation circuitry.

Referring now to FIG. 6, in an alternate embodiment of the gating circuitry, there is associated with each selection circuit an EXCLUSIVE OR gate 80 (80a, 80b, . . . , 80n) and an AND gate 82 (82a, 82b, . . . , 82n). The EXCLUSIVE OR gate 80 provides a positive output, enabling the associated AND gate 82, if and only if the data ready input line and the data ready output line have different signal levels thereon. Referring to FIG. 4, it can be seen that this occurs only when the associated buffer is empty. Furthermore, because the data ready input signal does not reach a selection circuit futher down the ordered array than the first available selection circuit, only that first available selection circuit will have a data ready input line signal which is different than its data ready output line signal. Consequently, only the first available buffer memory will be strobed or clocked to write the data available over the data input line 24.

It should be clear that there are many different circuit configurations for providing both the gating circuitry for enabling the correct buffer memory as well as for constructing the selection circuit 12. Importantly however, according to the invention, the illustrated MOS pass transistor 50 (FIG. 3) is particularly well adapted for its described purpose, in large measure because it is a bidirectional element. That is, it can pass current in both directions.

Additions, subtractions, deletions, and other modifications of the disclosed particular embodiments of the invention will be obvious to those practiced in the art and are within the scope of the following claims.

I claim:

1. A data buffer array allocation circuit for directing incoming data to an available one of a plurality of buffer memories, said circuit comprising a plurality of buffer selection circuits, each selection circuit being associated with one of said buffer memories and having
a clear input line,
a data ready input line,
a data ready output line, and
a buffer available line, means for connecting said selection circuits in an ordered linear array, the data ready output line of an earlier buffer selection circuit of the linear array being connected to the data ready input line of a next succeeding buffer selection circuit, and each said buffer selection circuit further comprising
means responsive to said data ready input line and said buffer available line, and
operable in a first state for effectively connecting said data ready input line to said data ready output line when said associated buffer has available data therein, and
operable in a second state for effectively isolating said data ready input line from said data ready output line when said associated buffer has no available data therein,
means responsive to an activating clear signal applied over said clear input line for setting said buffer available line to a signal indicating the absence of data in the associated buffer, and
means responsive to a data ready signal on said data ready input line for setting said buffer available line from said signal indicating the absence of data to a signal indicating the availability of data.

2. The data buffer array allocation circuit of claim 1 further comprising
means for directing an incoming data packet into the one of said plurality of buffer memories which is associated with the first buffer selection circuit in the ordered array wherein the ready input and ready output lines are effectively isolated from each other.

3. The data buffer array allocation circuit of claim 2 further wherein said directing means comprises circuit means connected to the data ready input and data ready output lines of each buffer selection circuit for controlling the input of data to each associated buffer memory.

4. The data buffer array allocation circuit of claim 2 further wherein said directing means comprises circuit means connected to the buffer available line of each buffer selection circuit for controlling the input of data to each associated buffer memory.

5. The data buffer allocation array circuit of claim 1 wherein said input line and buffer available line responsive means further comprises a metal oxide semiconductor circuit having a first pass-through switching element for connecting said data ready input signal line to said data ready output line, and a digital circuit means for latching said pass-through switching element to connect said data ready input and output lines when said buffer available line indicates the availability of data in said associated buffer at a time after said data ready input line signal level indicates that no data is available, and for latching said pass-through switching element for isolating said data ready input line from said data ready output line when said buffer available line has a signal thereon indicating the absence of available data in said associated buffer memory.

6. The data buffer allocation array circuit of claim 5 wherein said pass-through switching element is a metal oxide semiconductor bidirectional switching device.

7. The data buffer allocation array circuit of claim 5 further wherein said buffer line setting means comprises a latching circuit for setting said buffer available line to a state wherein said line provides a signal indicating the absence of data in response to a clear signal on said clear line, said latching circuit being responsive to a signal on said data ready input line, indicating the presence of data, for setting said buffer available line to a state indicating the presence of data in said associated buffer, said buffer available line indicating the absence of data thereafter only in resposne to a clear signal, and wherein said digital circuit is responsive to the termination of the data available signal on said data ready input line at a time after said buffer available line indicates the presence of data in said associated buffer, for setting said pass-through device to said connection state wherein said data ready input line and data ready output lines are connected, and said digital circuit is further responsive to the change of signal level on the said buffer available line indicating the absence of data for causing said pass-through device to isolate said data available input and output lines.

8. A data buffer array allocation circuit for directing incoming data to an available one of a plurality of buffer memories, said circuit comprising a plurality of buffer selection circuits, each circuit being associated with one of said buffer memories and having a clear input line,
a data ready input line,
a data ready output line, and
a buffer available line, means for connecting said selection circuits in an ordered linear array, the data ready output line of an earlier buffer selection circuit of the linear array being connected to the data ready input line of a next succeeding buffer selection circuit, means for directing said incoming data into the one of said plurality of buffer memories which is associated with the first buffer selection circuit of the ordered array wherein the data ready input and data ready output lines are effectively isolated from each other, each said buffer selection circuit further comprising a metal oxide semiconductor circuit having a controllable pass-through switching element for connecting said data ready input line to said data ready output line, a first latching circuit for setting said buffer available line in response to a clear signal on said clear line to a state wherein said line provides a signal indicating the absence of data in the associated buffer memory, said latching circuit being responsive to a signal on said data ready input line, indicating the presence of data, for setting said buffer available line to a state indicating the presence of data in said associated buffer, and to reset said buffer available line to indicate the absence of data thereafter only in response to a clear signal, a second latching circuit for controlling said pass-through switching element for effectively connecting said data ready input line to the data ready output line at a time after said buffer available line indicates the availability of data in said associated buffer and the data ready input line signal level indicates that no data is available, and for latching said pass-through switching element for isolating said data ready input line from said data ready output line when said buffer available line has a signal thereon indicating the absence of available data in said associated buffer memory, said second latching circuit being further responsive to the change of signal level on said buffer available line to a signal indicating the absence of data, for causing said pass-through switching element to effectively isolate the data ready input and data ready output lines, and wherein said second latching circuit is further responsive to the termination of the data available signal on said data ready input line at a time after said buffer available line indicates the presence of data in said associated buffer for controlling the pass-through device to connect said data ready input line and said data ready output line, and a line pull-up circuit for providing a signal on said data ready input line indicating the absence of ready data when said data ready input line is effectively otherwise in a floating condition.

* * * * *